United States Patent
Nejad et al.

(10) Patent No.: US 7,443,890 B2
(45) Date of Patent: Oct. 28, 2008

(54) MULTI-STAGE MULTIPLEXING CHIP SET HAVING SWITCHABLE FORWARD/REVERSE CLOCK RELATIONSHIP

(75) Inventors: Mohammad Nejad, Newport Beach, CA (US); Ali Ghiasi, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 938 days.

(21) Appl. No.: 10/602,227

(22) Filed: Jun. 24, 2003

(65) Prior Publication Data

US 2004/0037332 A1     Feb. 26, 2004

Related U.S. Application Data

(60) Provisional application No. 60/403,457, filed on Aug. 12, 2002.

(51) Int. Cl.
*H04J 3/02* (2006.01)
(52) U.S. Cl. ...................................... 370/541
(58) Field of Classification Search ................. 370/224, 370/249, 537–541, 916; 375/376
See application file for complete search history.

(56) References Cited

U.S. PATENT DOCUMENTS

| | | | | |
|---|---|---|---|---|
| 4,360,912 A | * | 11/1982 | Metz et al. | 370/449 |
| 4,667,324 A | * | 5/1987 | Graves | 370/538 |
| 4,811,341 A | * | 3/1989 | Fujimoto et al. | 370/541 |
| 5,940,456 A | * | 8/1999 | Chen et al. | 375/356 |
| 6,657,953 B1 | * | 12/2003 | Hiramoto et al. | 370/224 |
| 2003/0063626 A1 | * | 4/2003 | Karlquist | 370/503 |

* cited by examiner

*Primary Examiner*—Ricky Ngo
*Assistant Examiner*—Pao Sinkantarakorn
(74) *Attorney, Agent, or Firm*—Garlick Harrison & Markison; Bruce E. Garlick; Kevin L. Smith

(57) ABSTRACT

A multi-stage bit stream multiplexer that divides multiplexing functions between two or more integrated circuits. The first integrated circuit receives 16 bit streams to produce 4 output bits streams with a nominal data rate of 10 GBPS. A second integrated circuit multiplexes the 4 streams and to a bit stream with a data rate of 40 GBPS. The first IC is made in a standard CMOS process while the second IC is made using processes that support higher switching rates. The first IC produces a source-centered double data rate forward transmit clock from a reference clock selectable from either a crystal oscillator, a voltage controlled oscillator using a loop clock from the receive side of the bit stream multiplexer or a reverse clock generated by the second IC. The reverse clock can be selected as the source of the reference either by default, or in response to a specific condition.

48 Claims, 12 Drawing Sheets

Receiver Input and Source Centered Clock Performance

| Parameter | Symbol | Conditions | Min | Typ | Max | Units |
|---|---|---|---|---|---|---|
| Output Common Mode | Vcm | See Figure Below | 1575 | 1675 | 1775 | mV |
| Single Ended Output Impedance | $Z_{SE}$ | | 40 | 50 | 60 | Ω |
| Differential Input impedance | $Z_d$ | | 80 | 100 | 120 | Ω |
| Input Impedance Mismatch | $Z_M$ | | | | 10 | % |
| Q40, CML Input Differential Amplitude, p-p | Δ VQDO | See Figure Below | 400 | 500 | 600 | mV |
| Q40 Input Rise and Fall Time (20% to 80%) | $t_{RH}$, $t_{FH}$ | | | 25 | 35 | ps |
| Differential output return loss* | S11 | Up to 7.5 GHz | 10 | | | dB |
| 4-by-1 mux input return loss >15 db at 10 GHz | | | | | | |

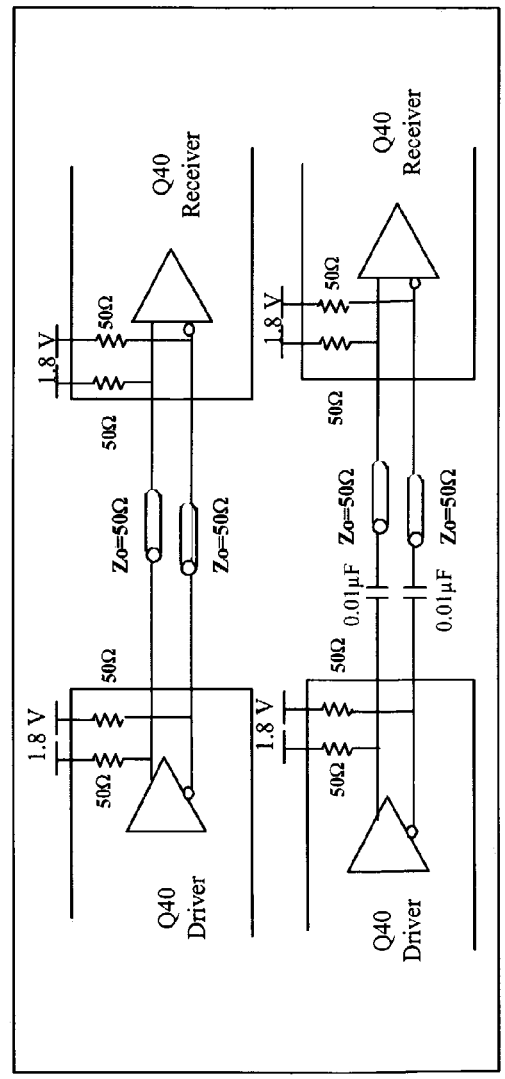

FIG. 7

MULTI-STAGE MULTIPLEXING CHIP SET HAVING SWITCHABLE FORWARD/REVERSE CLOCK RELATIONSHIP

CROSS REFERENCE TO RELATED APPLICATION

This application claims priority to U.S. Provisional Application Ser. No. 60/403,457, filed Aug. 12, 2002, which is incorporated herein by reference in its entirety for all purposes.

BACKGROUND OF THE INVENTION

1. Technical Field of the Invention

The present invention relates generally to communication systems; and more particularly to high-speed serial bit stream multiplexing.

2. Description Of Related Art

The structure and operation of communication systems is generally well known. Communication systems support the transfer of information from one location to another location. Early examples of communication systems included the telegraph and the public switch telephone network (PSTN). When initially constructed, the PSTN was a circuit switched network that supported only analog voice communications. As the PSTN advanced in its structure and operation, it supported digital communications. The Internet is a more recently developed communication system that supports digital communications. As contrasted to the PSTN, the Internet is a packet switch network.

The Internet consists of a plurality of switch hubs and digital communication lines that interconnect the switch hubs. Many of the digital communication lines of the Internet are serviced via fiber optic cables (media). Fiber optic media supports high-speed communications and provides substantial bandwidth, as compared to copper media. At the switch hubs, switching equipment is used to switch data communications between digital communication lines. WANs, Internet service providers (ISPs), and various other networks access the Internet at these switch hubs. This structure is not unique to the Internet, however. Portions of the PSTN, wireless cellular network infrastructure, Wide Area Networks (WANs), and other communication systems also employ this same structure.

The switch hubs employ switches to route incoming traffic and outgoing traffic. A typical switch located at a switch hub includes a housing having a plurality of slots that are designed to receive Printed Circuit Boards (PCBs) upon which integrated circuits and various media connectors are mounted. The PCBs removably mount within the racks of the housing and typically communicate with one another via a back plane of the housing. Each PCB typically includes at least two media connectors that couple the PCB to a pair of optical cables and/or copper media. The optical and/or copper media serves to couple the PCB to other PCBs located in the same geographic area or to other PCBs located at another geographic area.

For example, a switch that services a building in a large city couples via fiber media to switches mounted in other buildings within the city and switches located in other cities and even in other countries. Typically, Application Specific Integrated Circuits (ASICs) are mounted upon the PCBs of the housing. These ASICs perform switching operations for the data that is received on the coupled media and transmitted on the coupled media. The coupled media typically terminates in a receptacle and transceiving circuitry coupled thereto performs signal conversion operations. In most installations, the media, e.g., optical media, operates in a simplex fashion. In such case, one optical media carries incoming data (RX data) to the PCB while another optical media carries outgoing data (TX data) from the PCB. Thus, the transceiving circuitry typically includes incoming circuitry and outgoing circuitry, each of which couples to a media connector on a first side and communicatively couples to the ASIC on a second side. The ASIC may also couple to a back plane interface that allows the ASIC to communicate with other ASICs located in the enclosure via a back plane connection. The ASIC is designed and implemented to provide desired switching operations. The operation of such enclosures and the PCBs mounted therein is generally known.

The conversion of information from the optical media or copper media to a signal that may be received by the ASIC and vice versa requires satisfaction of a number of requirements. First, the coupled physical media has particular RX signal requirements and TX signal requirements. These requirements must be met at the boundary of the connector to the physical media. Further, the ASIC has its own unique RX and TX signal requirements. These requirements must be met at the ASIC interface. Thus, the transceiving circuit that resides between the physical media and the ASIC must satisfy all of these requirements.

Various standardized interfaces have been employed to couple the transceiving circuit to the ASIC. These standardized interfaces include the XAUI interface, the Xenpak interface, the GBIC interface, the XGMII interface, and the SFI-5 interface, among others. The SFI-5 interface, for example, includes 16 data lines, each of which supports a serial bit stream having a nominal bit rate of 2.5 Giga-bits-per-second (GBPS). Line interfaces also have their own operational characteristics. Particular high-speed line interfaces are the OC-768 interface and the SEL-768 interface. Each of these interfaces provides a high-speed serial interface operating at a nominal bit rate of 40 GBPS.

Particular difficulties arise in converting data between the 40×1 GBPS line interface and the 16×2.5 GBPS communication ASIC interface. In particular, operation on the 40 GBPS side requires the ability to switch data at a very high bit rate, e.g., exceeding the bit rate possible with a CMOS integrated circuit formed of Silicon. While other materials, e.g., Indium-Phosphate and Silicon-Germanium provide higher switching rates than do Silicon based devices, they are very expensive and difficult to manufacture. Further, the functional requirements of interfacing the 40×1 GBPS line interface and the 16×2.5 GBPS communication ASIC interface are substantial. Thus, even if a device were manufactured that could perform such interfacing operations, the effective yield in an Indium-Phosphate or Silicon-Germanium process would be very low.

When multiple chips are assembled to provide an end-to-end solution in a high speed serial communications system such as the one described above, a decision has to be made as to the source for the clock that latches the data into the downstream circuit (i.e. the data receiving the data. One choice is to have the downstream circuit generate its own clock for latching the data. While this choice permits the upstream circuit to be simpler, there also can be problems associated with generating the clock on the chip that is receiving the data, such as jitter and phase alignment issues. Generating the clock at the upstream circuit may provide a cleaner clock that is more related to the data, but it also serves to render the upstream more complex.

Thus, there is a need in the art for a low cost and high speed interface that couples a high-speed line side interface to a communication ASIC, and particularly one that provides for as much flexibility as possible in its clock generation.

SUMMARY OF THE INVENTION

The present invention provides a multistage bit stream multiplexer that couples a communication Application Specific Integrate Circuit (ASIC) to a high-speed bit stream media. More specifically, the present invention provides a multistage bit stream multiplexer having a switchable forward/reverse clock relationship. The multistage bit stream multiplexer includes a first multiplexing circuit that receives a first set of bit streams at a first bit rate and that produces a second set of bit streams at a second bit rate. The first set of bit streams are greater in number than the second set of bit streams are in number, and the first bit rate is less than the second bit rate. A second multiplexing circuit receives the second set of bit streams and outputs high-speed bit stream(s) at a bit rate that exceeds the second bit rate. The first and second multiplexing circuits may be formed on any combination of InP, SiGe, GaN, GaAs, or Si substrates. This staging of the multiplexing process allows the relatively slower switching circuits to employ standard processing techniques, while faster switching circuits that employ more costly processes may be simplified.

A clock circuit generates a forward transmit clock for the first multiplexing circuit. The first multiplexing circuit produces the second set of bit streams based upon a reference clock signal selectable from a plurality of inputs. These inputs include the reverse transmit clock generated by the second multiplexing circuit. Additionally, these inputs may include an external oscillator output or a voltage controlled oscillator output. The reference clock signal may be selected based upon a clock selector input.

The first multiplexing circuit may additionally include a phase locked loop (PLL) that receives the reference clock signal and that produces a PLL Data Clock. The PLL Data Clock may have a frequency equal to the second bit rate. Latches receive this PLL Data Clock and use it to latch data multiplexed from the first set of bit streams and produce the second set of bit streams. A division circuit receives the PLL Data Clock and generates the forward transmit clock. This relationship allows the forward transmit clock to be a source centered double data rate clock with respect to each of the second bit streams.

The PLL may additionally output to the second multiplexing circuit, a lock detect signal that remains active while the PLL is locked to the reference clock signal. This lock detect signal becomes inactive when the PLL is not locked to the reference clock signal. The first multiplexing circuit may select the reverse clock according to logical rules within the clock selector when the PLL is not locked to the reference clock signal.

This embodiment may be expanded to include a communication Application Specific Integrated Circuit (ASIC) from which the first multiplexing circuit receives the first set of bit streams, and a media interface that receives the high-speed bit stream and produces a media output.

Another embodiment provides an upstream multiplexing circuit within a multi-stage bit stream multiplexer. This upstream multiplexing circuit operates with a switchable forward/reverse clock relationship relative to a downstream multiplexing circuit. The upstream multiplexing circuit includes a number of input ports that receive a first set of bit streams at a first bit rate. A number of output ports allow the upstream multiplexing circuit to output a second set of bit streams at a second bit rate. Here, the first set of bit streams is greater in number than the second set of bit streams are in number, and the first bit rate is less than the second bit rate. A clock circuit generates a forward transmit clock signal for the upstream multiplexing circuit. This allows the upstream multiplexing circuit to produce the second set of bit streams based upon a reference clock signal selectable from a number of inputs. These inputs include a reverse transmit generated by the downstream integrated circuit. Additionally, these inputs may include an external oscillator output or a voltage-controlled oscillator The upstream multiplexing circuit may further include a PLL that receives the reference clock signal and produces a PLL Data Clock. A number of latches receive the PLL Data Clock and latch data multiplexed from the first bit streams and produce the second bit streams. Additionally, the PLL may output signals used by logical constructs that determine the source of the reference signal. One such construct outputs to the upstream multiplexing circuit, a lock detect signal that remains active while the PLL is locked to the reference clock signal and becomes inactive when the PLL is not locked to the reference clock signal. Additionally, the circuit may select the reverse clock through the clock selector when the PLL is not locked to the reference clock.

As with the previous embodiment, the upstream and downstream multiplexing circuits may be constructed on any combination of known substrates, such as, but not limited to InP, SiGe, GaN, GaAs, and Si. This staging of the multiplexing process allows the relatively slower switching circuits to employ more cost effective processing techniques, while faster switching circuits that employ more costly processes may be simplified. Thus, the overall cost of the circuit is reduced while reliability is increased.

The present invention may also be expressed as a method of multiplexing a first set of bit streams to a high-speed bit stream with a multistage multiplexer. This methodology begins by first receiving the first set of bit streams at a first stage multiplexing circuit at a first bit rate. The first bit streams are then multiplexed into a second set of bit streams at a second bit rate, wherein the second bit rate exceeds the first bit rate. A second stage multiplexing circuit receives the second set of bit streams and multiplexes them into a high-speed bit stream having a bit rate that exceeds the second bit rate.

A forward transmit clock generates from a reference clock signal selectable from a number of inputs, where these inputs include a reverse transmit clock generated by the second stage multiplexing circuit. A logic construct may be used to determine the selected input. In one case, a lock detect signal indicates when a PLL is locked to the reference clock signal. A reverse transmit clock may be selected as the reference clock signal when the PLL is not locked to the reference clock. This selection may be implemented with a clock selector.

Another embodiment includes a first transmit data multiplexing circuit that has an input that receives a first plurality of transmit bit streams at a first bit rate from the communication ASIC and an output that produces a second plurality of transmit bit streams at a second bit rate. The second plurality has fewer transmit bit streams than the first plurality. The first transmit data multiplexing circuit also produces a forward transmit clock having a frequency that is half of the second bit rate.

The bit stream multiplexer further includes a second transmit data multiplexing circuit having an input that receives the second plurality of transmit bit streams at the second bit rate, an input that receives the forward transmit clock, and an output that produces a single bit stream output at a line bit rate. An embodiment the bit stream multiplexer further includes a media interface that receives the single bit stream output at the line bit rate and couples the single bit stream output at the line bit rate to the high-speed bit stream media.

The first transmit data multiplexing circuit derives the forward transmit clock from a reference clock. The reference clock is selectable from a plurality of source inputs. One of the plurality of source inputs is operable to receive a reverse transmit clock produced by an output of the second transmit data multiplexing circuit. The reference clock is selectable between the reverse clock and external oscillator clocks based on the state of a first selectable input to the first transmit data multiplexing circuit. The first transmit data multiplexing circuit includes a PLL that has an output, coupled to an input of the second transmit data multiplexing circuit, that produces a lock detect signal that is active when the PLL is locked to the reference clock and inactive when it is not. The second transmit data multiplexing circuit has an output that selects the reverse clock by activating the first select input of the first transmit data multiplexing circuit when the lock detect signal becomes inactive.

A transmit data multiplexer integrated circuit multiplexes the data transmitted over a first plurality of bit streams at a first bit rate to a second and smaller plurality of bit streams transmitted at a second bit rate, the transmit data multiplexer integrated circuit further includes a data input that receives the first plurality of transmit bit streams, a data output that produces a second plurality of transmit bit streams at a second bit rate, and an output producing a forward transmit clock having a frequency that is half of the second bit rate. The transmit data multiplexing circuit derives the forward transmit clock from a reference clock, the reference clock is selectable from a plurality of source inputs, one of the plurality of source inputs operable for receiving a reverse transmit clock.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 7 is a table and a diagram that illustrate operating specifications for the TX interface between the TX data multiplexer circuits of FIG. 3;

DETAILED DESCRIPTION OF THE INVENTION

Preferred embodiments of the present invention are illustrated in the FIGUREs, like numerals being used to refer to like and corresponding parts of the various drawings.

Figure 1:
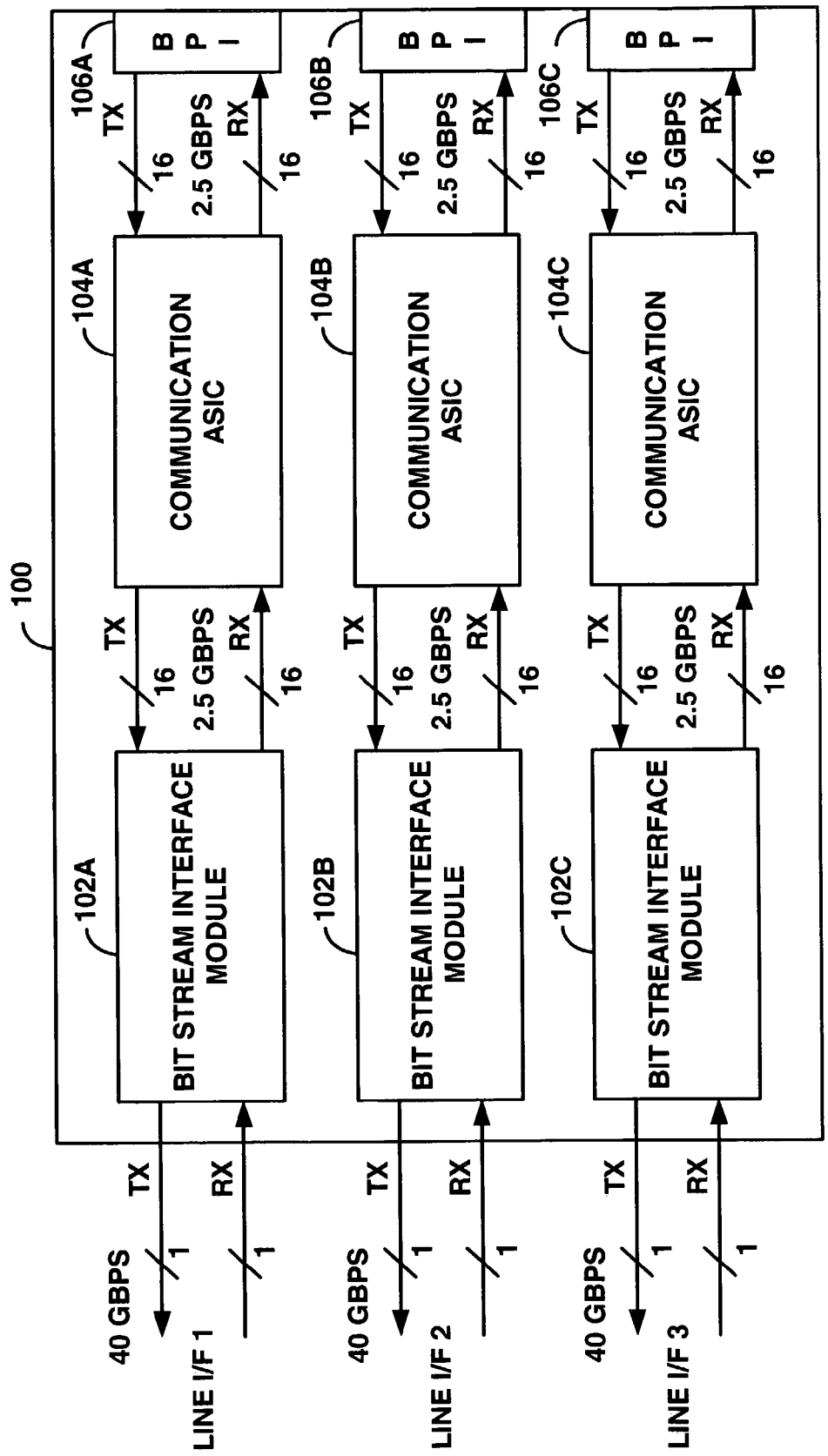
FIG. 1 is a block diagram illustrating a Printed Circuit Board (PCB) that has mounted thereon a plurality of Bit Stream Interface Module (BSIMs) constructed according to the present invention.

FIG. 1 provides a block diagram depicting a Printed Circuit Board (PCB) that has mounted thereon a plurality of Bit Stream Interface Module (BSIMs). As shown in FIG. 1, the PCB 100 includes BSIMs 102A, 102B and 102C. The PCB 100 also includes mounted thereupon communication Application Specific Integrated Circuits (ASIC) 104A, 104B, and 104C. The PCB 100 is mounted within a housing that services switching requirements within a particular location or geographic area. Each of the BSIMs 102A, 102B, and 102C couples to a high-speed media such as an optical fiber or other media as known to those skilled in the art, via a respective media interface and supports the OC-768 or the SEC-768 standard at such media interface. On the second side of the BSIMs 102A through 102C, the SFI-5 interface standard is supported. Communication ASIC 104A through 104C may communicate with other PCB components located in the housing via back interfaces 106A through 106C.

The BSIMs 102A through 102C may be removably mounted upon the PCB 100. In such case, if one of the BSIMs 102A through 102C fails it may be removed and replaced without disrupting operation of other devices on the PCB 100. When the BSIMs 102A-102C are removably mounted upon the PCB 100, they are received by a socket or connection coupled to the PCB 100. Further, in such embodiment, the BSIMs 102A-102C may be constructed on a separate PCB.

Figure 2A:
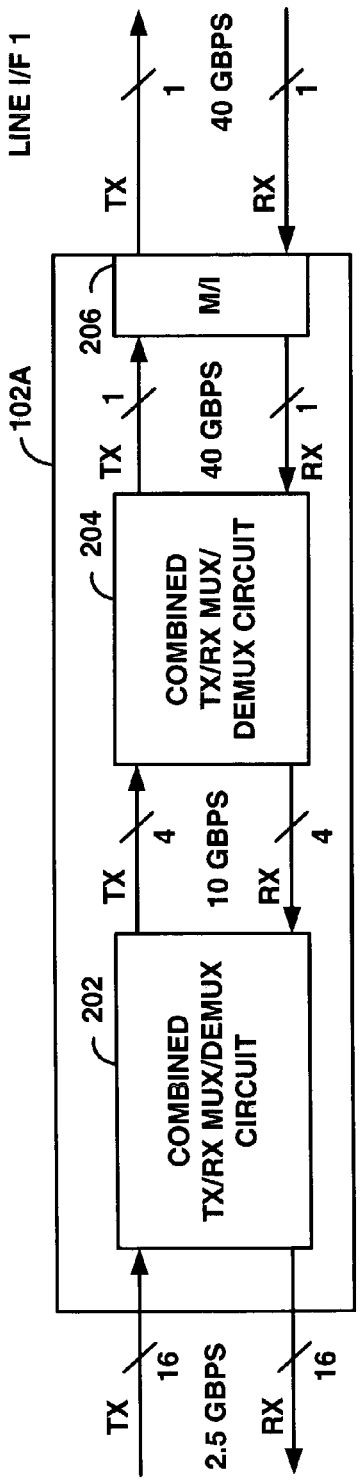
FIG. 2A is a block diagram illustrating one embodiment of a BSIM constructed according to the present invention.

FIG. 2A is a block diagram illustrating one embodiment of a BSIM 102A constructed according to the present invention. The BSIM 102A of FIG. 2A includes a first combined TX/RX multiplexer/demultiplexer circuit 202 and a second combined TX/RX multiplexer/demultiplexer circuit 204. On the line side of the BSIM 102A, the first combined TX/RX multiplexer/demultiplexer circuit 202 couples to a media, e.g., fiber optic cable or copper cable, via a media interface 206. Media interface 206 couples to the combined TX/RX multiplexer/demultiplexer circuit 204 via a 40 GBPS nominal bit rate, one bit transmit and one bit receive interface. The TX and RX line medias themselves each support one bit 40 Giga bits-per-second (GBPS) nominal bit rate communications, such as is defined by the OC-768 and/or SEC 768 specifications of the OIF.

The combined TX/RX multiplexer/demultiplexer circuit 202 interfaces with a communication ASIC, e.g. 104A, as shown in FIG. 1, via 16 TX bit lines and 16 RX bit lines, each operating at a nominal bit rate of 2.5 GBPS. Such interface supports a nominal total throughput of 40 GBPS (16*2.5 GBPS). The interface between the combined TX/RX multiplexer/demultiplexer circuit 202 and the combined TX/RX multiplexer/demultiplexer circuit 204 includes 4 TX bit lines and 4 RX bit lines, each operating at a nominal rate of 10 GBPS. This interface supports a nominal total throughput of 40 GBPS (4*10 GBPS). This interface may operate substantially or fully in accordance with an operating standard known as the Q40 operating standard. However, the teachings of the present invention are not limited to according to operation of the Q40 standard nor is the description here intended to be a complete description of the Q40 standard itself.

Figure 2B:
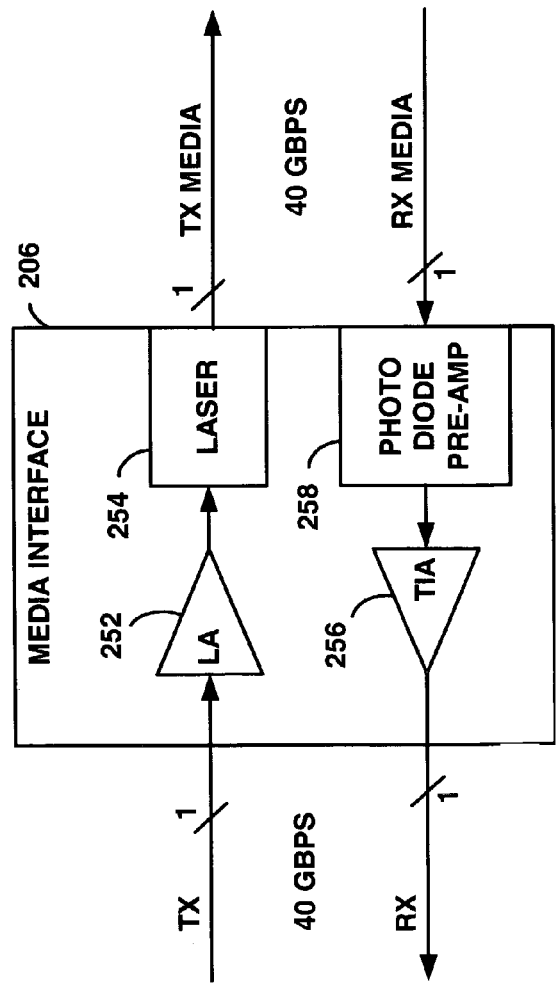
FIG. 2B is a block diagram illustrating an optical media interface that may be included wit the BSIM of FIG. 2A.

FIG. 2B is a block diagram illustrating an optical media interface that may be included with the BSIM of FIG. 2A. As shown in FIG. 2B, media interface 206 couples to an optical media on a first side and couples to the combined TX/RX multiplexer/demultiplexer circuit 204 on a second side. In the transmit path, media interface 206 receives a single bit stream at a nominal bit rate of 40 GBPS from combined TX/RX multiplexer/demultiplexer circuit 204. The TX bit stream is amplified. Limiting amplifier 252 amplifies the TX bit stream to produce a bit stream output received by laser 254. The laser produces an optical signal that is coupled to TX optical media.

On the receive side, an RX optical media produces the RX bit stream at a nominal bit rate of 40 GBPS. The RX bit stream is received by a photo diode/pre-amplifier combination 258. The photo diode/pre-amplifier combination 258 outputs to a transimpedance amplifier 256. Transimpedance amplifier 256 produces a single bit stream at a nominal bit rate of 40 GBPS that is provided to the combined TX/RX multiplexer/ demultiplexer, circuit 204 of FIG. 2A.

Figure 3:
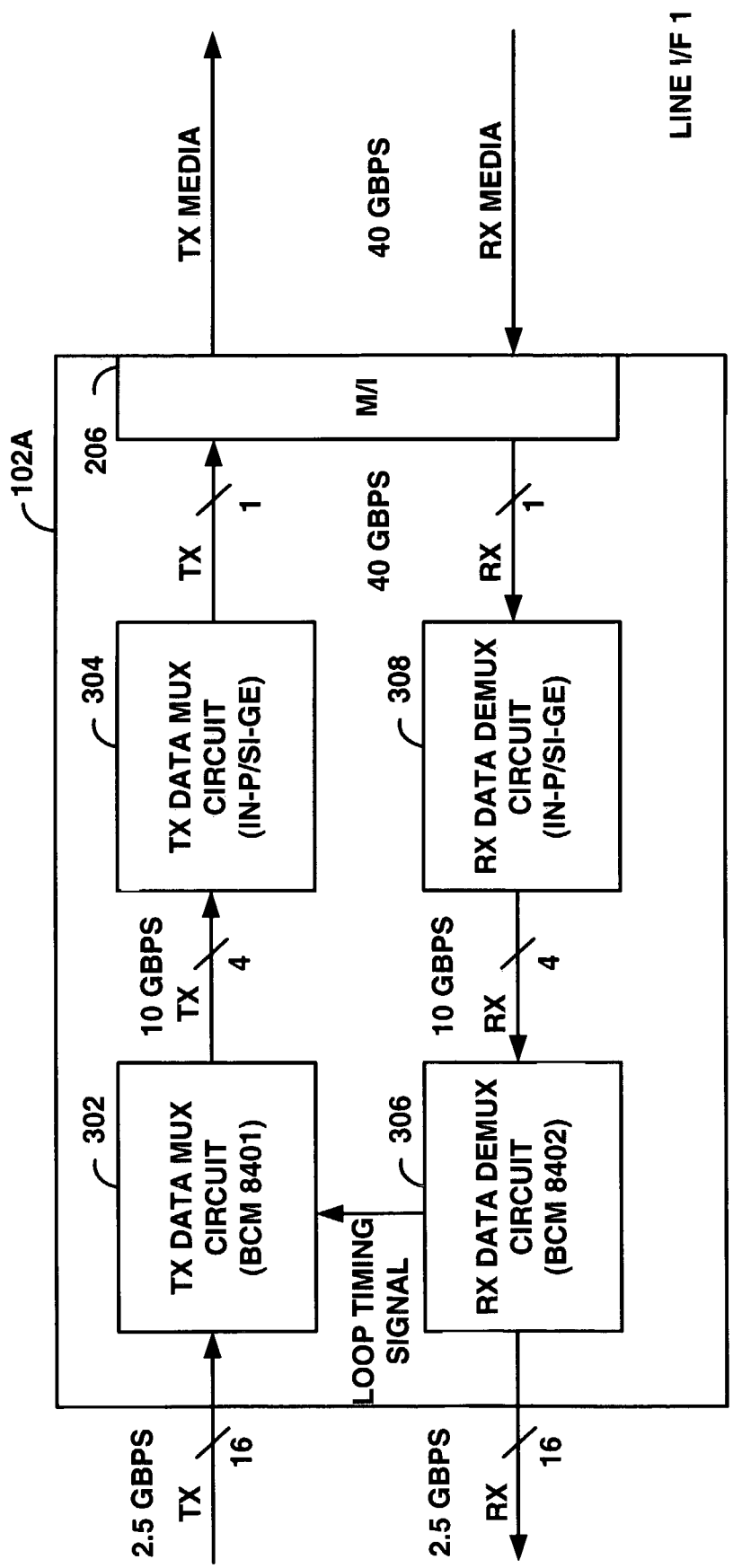
FIG. 3 is a block diagram illustrating another embodiment of a BSIM constructed according to the present invention.

FIG. 3 provides a block diagram illustrating another embodiment of a BSIM constructed according to the present invention. The embodiment of FIG. 3 differs from the embodiment of FIG. 2A in that separate TX and RX circuit components are employed. While FIG. 3 depicts media interface 206 as a single device, such as shown in FIG. 2B, in other embodiments, the media interface 206 may be formed in separate circuits corresponding to the separate TX and RX paths shown in FIG. 2B.

In the TX path, TX data multiplexer circuit 302 receives a 16 bit wide by 2.5 GBPS nominal bit rate input from a coupled ASIC and produces a 4 bit wide×10 GBPS nominal bit rate TX output. In this disclosure, TX data multiplexer circuit 302 may be referred to as an upstream data multiplexer or first stage data multiplexer with respect to TX data multiplexer 304 which may be referred to as a downstream multiplexer circuit or second stage data multiplexer. In the embodiment described herein, the TX data multiplexer circuit 302 is constructed in a Silicon CMOS process, for example in a 0.13 micron CMOS process. However, any similar process known to those skilled in the art may be used. The TX data multiplexer circuit 302 multiplexes the 16 bit wide by 2.5 GBPS nominal bit rate input to produce a 4 bit wide 10 GBPS nominal bit rate output, which is received by the TX data multiplexer circuit 304. TX data multiplexer circuit 304 then multiplexes the 4 bit wide×10 GBPS nominal bit rate output to produce a single bit wide output at a nominal bit rate of 40 GBPS. A clock circuit, not shown in FIG. 3 provides a signal with which to latch data within the TX data multiplexer 302. This clock circuit may be generated internally or based on external inputs such as the loop-timing signal supplied from data demultiplexer circuit 306 to data multiplexer circuit 302.

The TX data multiplexer circuit 304 and RX data demultiplexer circuit 308 switch at a frequency that is at least four times the rate at which the TX data multiplexer circuit 302 and TX data demultiplexer circuit 306 must switch. For this reason, the TX data multiplexer circuit 304 and RX data multiplexer circuit 308 may be constructed in an Indium-Phosphate process or in a Silicon-Germanium process. Each of these processes supports the higher switching rates required at GBPS. Thus, combining TX data multiplexer circuit 302 constructed in a CMOS process and TX data multiplexer circuit 304 constructed in an Indium-Phosphate or Silicon-Germanium process provides a high performance relatively low cost solution to the interfacing of a 2.5 GBPS nominal bit rate 16 bit wide interface and a 40 GBPS 1 bit wide interface.

Likewise, in the RX path, the bit stream interface module 102A includes an RX data demultiplexer circuit 308 that receives a bit stream at a nominal bit rate of 40 GBPS data. The RX data demultiplexer circuit 308 produces a 4 bit wide× 10 GBPS nominal bit rate output for RX data demultiplexer circuit 306. RX data demultiplexer circuit 306 then produces a 16 bit wide×2.5 GBPS nominal bit rate receive data stream.

As was the case with TX data multiplexer circuit 302 and TX data multiplexer circuit 304, RX data demultiplexer circuit 306 and RX data demultiplexer circuit 308 may be formed in differing process types. In one embodiment RX data demultiplexer circuit 306 is constructed in a Silicon CMOS process. Further, TX data demultiplexer circuit 304 and RX data demultiplexer circuit 308 may be constructed in an Indium-Phosphate, Silicon-Germanium or other process known to those skilled in the art in order to support higher switching speeds required by the 1 bit wide×40 GBPS interface to the media interface 206.

Figure 4A:
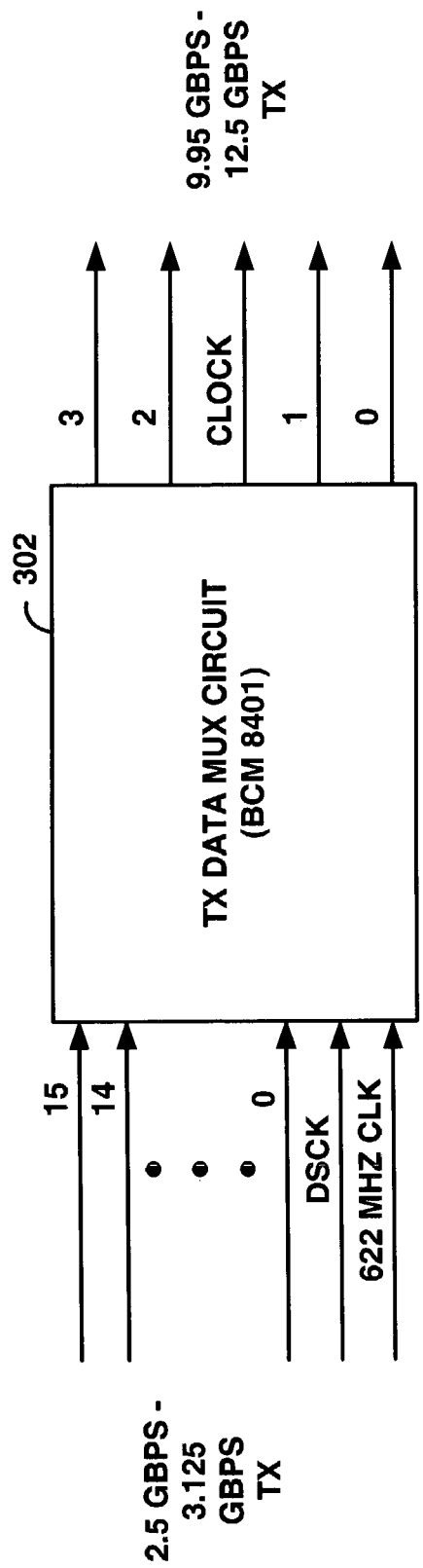
FIG. 4A is a block diagram illustrating a TX data multiplexer circuit constructed according to the present invention.

FIG. 4A provides a block diagram illustrating a TX data multiplexer circuit constructed according to the present invention. As shown in FIG. 4A, the TX data multiplexer circuit 302 receives 16 bit steams of data at nominal bit rate of 2.5 GBPS on each bit line from the communication ASIC 104A. In this embodiment, each bit line of this 16 bit wide interface can operate at up to 3.125 GBPS. This interface also includes a DSCK clock and 622 MHz clock. The output of the TX data multiplexer circuit 302 includes 4 bit lines, each of which supports a nominal bit rate of 10 GBPS. Similarly, the output of TX data multiplexer circuit 302 can produce data at bit rates of between 9.95 GBPS and 12.5 GBPS. TX data multiplexer circuit 302 also produces a clock signal at one-half the nominal bit rate of the 4 bit stream paths. When the nominal bit rate of the data paths is 10 GBPS, the clock will be produced nominally at 5 GHz. The speeds or bit rates described here and throughout the application illustrate specific embodiments. However, it is understood that other speeds and bit rates may be similarly employed.

Figure 4B:
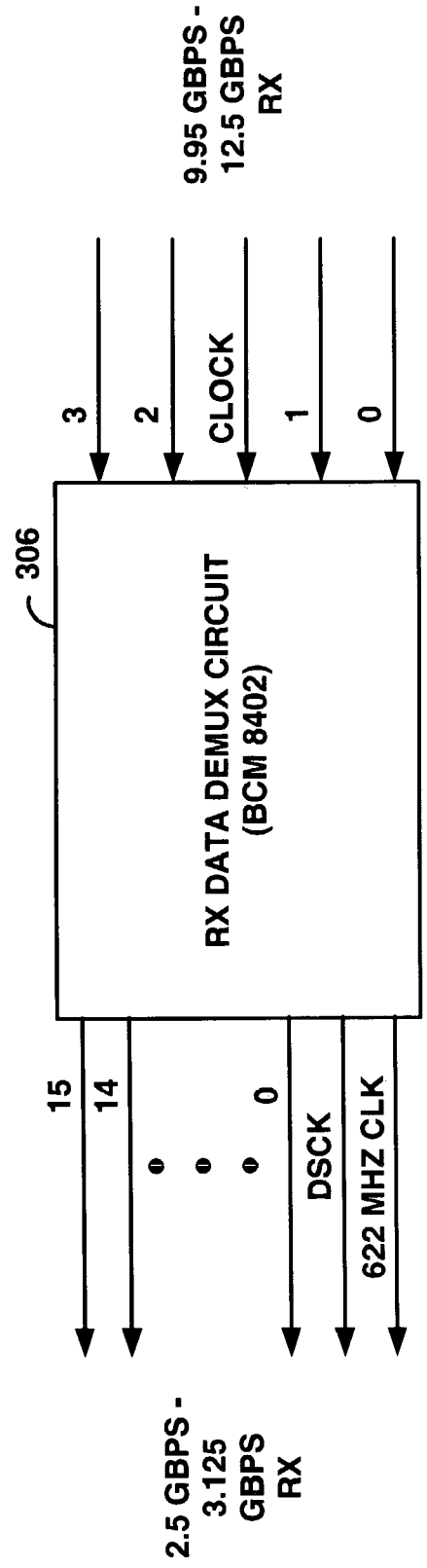
FIG. 4B is a block diagram illustrating an RX data demultiplexer circuit constructed according to the present invention.

FIG. 4B provides a block diagram illustrating RX data demultiplexer circuit 306 constructed according to the present invention. As shown in FIG. 4B, RX data demultiplexer circuit 306 receives 4 bit streams at nominal bit rates of 10 GBPS each, but may operate in the range of 9.95 GBPS to 12.5 GBPS. RX data demultiplexer circuit 306 produces 16 bit stream outputs at a nominal bit rate of 2.5 GBPS. However, RX data demultiplexer circuit 306 may produce the 16 bit streams output at a bit rate as high as 3.125 GBPS.

Figure 5:
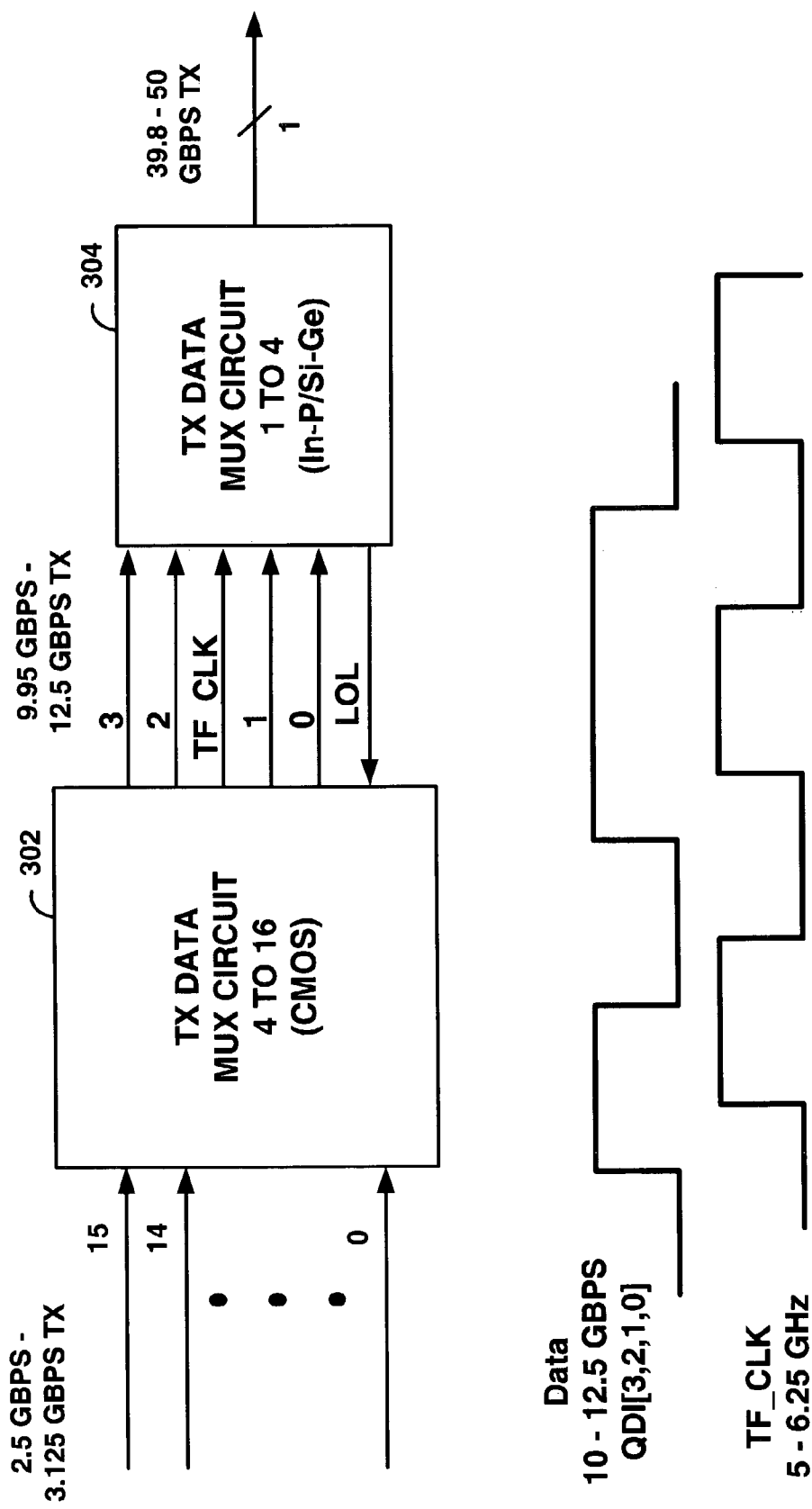
FIG. 5 is a block diagram illustrating the TX data multiplexer circuits of FIG. 3 and the interfaces serviced thereby.

FIG. 5 provides a block diagram illustrating the TX data multiplexer circuits 302 and 304 of FIG. 3 and the interfaces serviced thereby. As is shown in FIG. 5, the TX data multiplexer circuit 302 receives 16 bit streams at nominal bit rates of 2.5 GBPS and produces 4 bit streams 209 at nominal bit rates of 10 GBPS. Such operation corresponds to a 16 to 4 multiplexing operation. The TX data multiplexer circuit 302 also produces a framer clock output at 622 MHz and receives a reference clock input at 622 MHz. A loss of lock signal (LOS_LCK) signaled from the TX data multiplexer circuit 302 is also received by TX data multiplexer circuit 304. Further, the TX data multiplexer circuit 304 receives the 4 bit streams at nominal bit rates of 10 GBPS and produces the single bit output at a nominal bit rate of 40 GBPS. However, the TX data multiplexer circuit 304 that performs the 4 to 1 multiplexing operates between 39.8 GBPS and 50 GBPS. The bit rates indicated herein are provided not to limit the scope of the present invention but only to describe contemplated embodiments for implementing the teachings of the present invention. The signal transition diagrams of FIG. 5, indicating the data and the TF_CLK signal, show that the data bit rate is twice the rate of the TF_CLK signal. In such case, data is latched on the 4 bit×10 GBPS link at each transition of the TF_CLK.

Figure 6A:
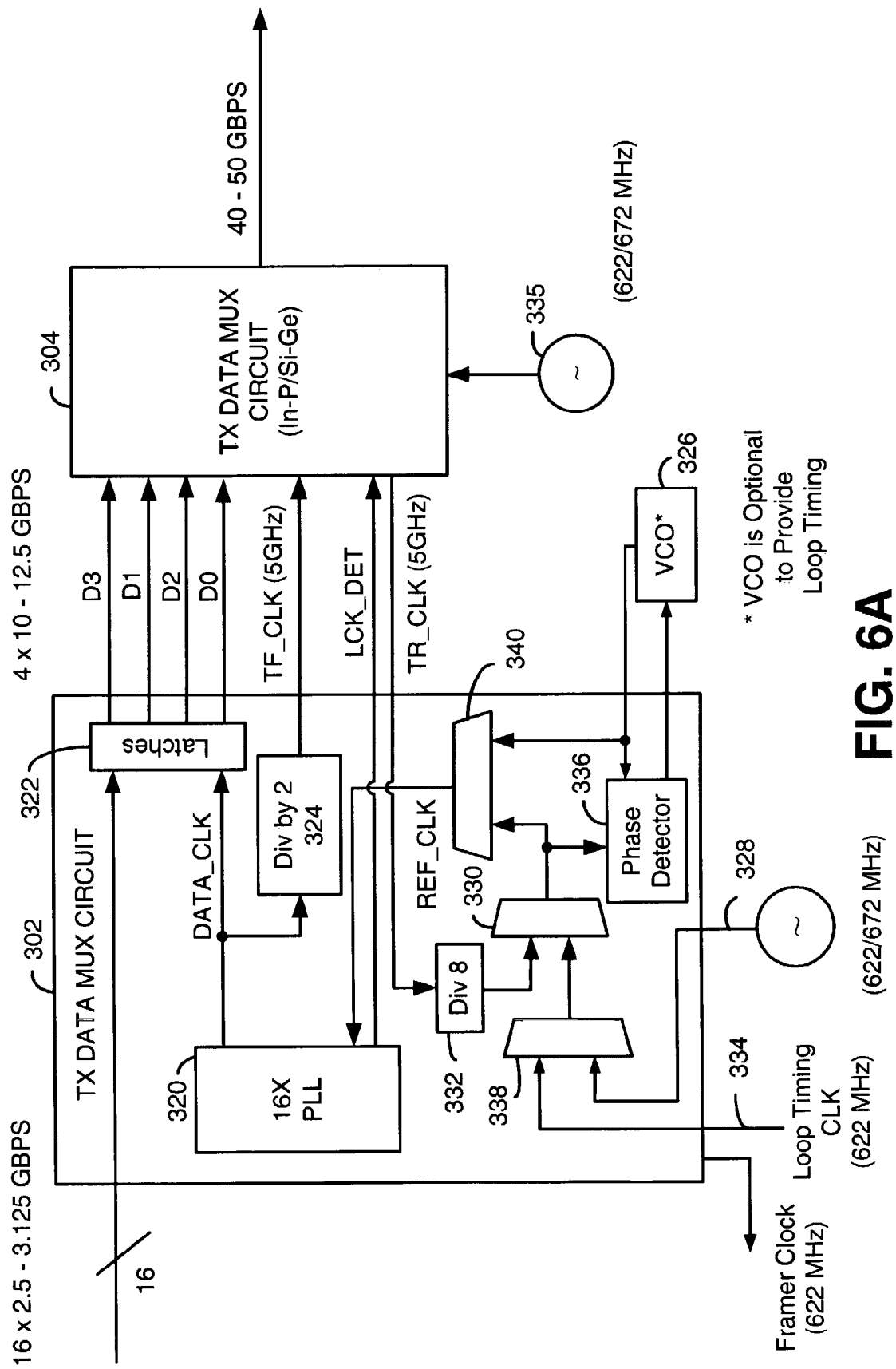
FIG. 6A provides a block diagram that functionally illustrates the many sources of the reference clock used to latch data within the upstream multiplexer circuit.

FIG. 6A illustrates in more detail the manner in which the clocks are generated for TX data multiplexer circuit 302 and TX data multiplexer circuit 304. The forward transmit clock, TF_CLK, derives from an internal reference clock REF_CLK, wherein the reference clock is based on one of many selectable inputs. These inputs will be described more detail following a discussion of the PLL 320. PLL 320 multiplies REF_CLK by 16 to produce DATA_CLK. DATA_CLK clocks multiplexed data into latches 322, the outputs of which produce 4-bit streams D0-D3. As previously discussed, bit streams D0-D3 have a data rate of between 10 and 12.5 GBPS. Thus, DATA_CLK has a frequency that is equal to the data rate of the bit streams it is producing by latching multiplexed data onto D0-D3. Circuit 324 divides DATA_CLK to produce TF_CLK at half the frequency, and which is source centered with respect to the data being latched onto D0-D3.

REF_CLK can be derived from a number of reference sources or selectable inputs based on selections made at multiplexers 330, 338, and 340. Oscillator reference clock 328 can be the source of REF_CLK with the requisite select input values. In that case, DATA_CLK will be 16 times the frequency supplied by the external oscillator. This frequency can range from 622 to 672 MHz. Similarly, loop-timing clock 334, provided by RX data demultiplexer 306, also at about 622 MHz., can be selected depending on the inputs to circuit 338. Typically, the loop-timing clock 334 serves as a reference for a phase locked loop (PLL) that is made up of VCO 326, and phase detector 336. The phase detector 336 determines any phase difference between loop timing clock 334 and the output of VCO 326.

REF_CLK can also be derived from reverse clock TR_CLK that is, like the TF_CLK, about 5 GHz in frequency. The TX data multiplexer circuit 304 using a crystal oscillator 335 at 622 to 672 MHz generates TR_CLK. A PLL on board the TX data multiplexer circuit 304 multiplies the 622 MHz clock to 5 GHz. Inside TX data multiplexer 302, circuit 332 divides reverse clock TR_CLK by 8. This signal, when multiplied by 16 and phase aligned by PLL 320, produces 10 GHz DATA_CLK and the forward transmit clock TF_CLK, when divided by 2. Those of average skill in the art will recognize that it may be advantageous to have the reference clock REF_CLK generated on a different integrated circuit, such as the TX data multiplexer circuit 304.

The PLL 320 produces an output LCK_DET that remains active when PLL 320 is phase locked with the reference clock, REF_CLK. This output signal can be provided as an input to the TX data multiplexer circuit 304. If the REF_CLK is generating from either the VCO 326 or the oscillator reference output 328, and the PLL loses its lock for greater than a predetermined time, inputs at multiplexer 330 may choose reverse transmit clock, TR_CLK, which is divided down by circuit 332, as the reference clock REF_CLK for PLL 320. This ensures continued operation if for example, the oscillator producing output 328 or the VCO 334 becomes inoperative or otherwise malfunctions. The multistage multiplexer described may chose one of several inputs for the reference clock used to latch data. Additionally, an upstream or first stage multiplexer having this ability may in fact couple to downstream or second stage multiplexers less capable than the one shown in FIG. 6A.

Figure 6B:
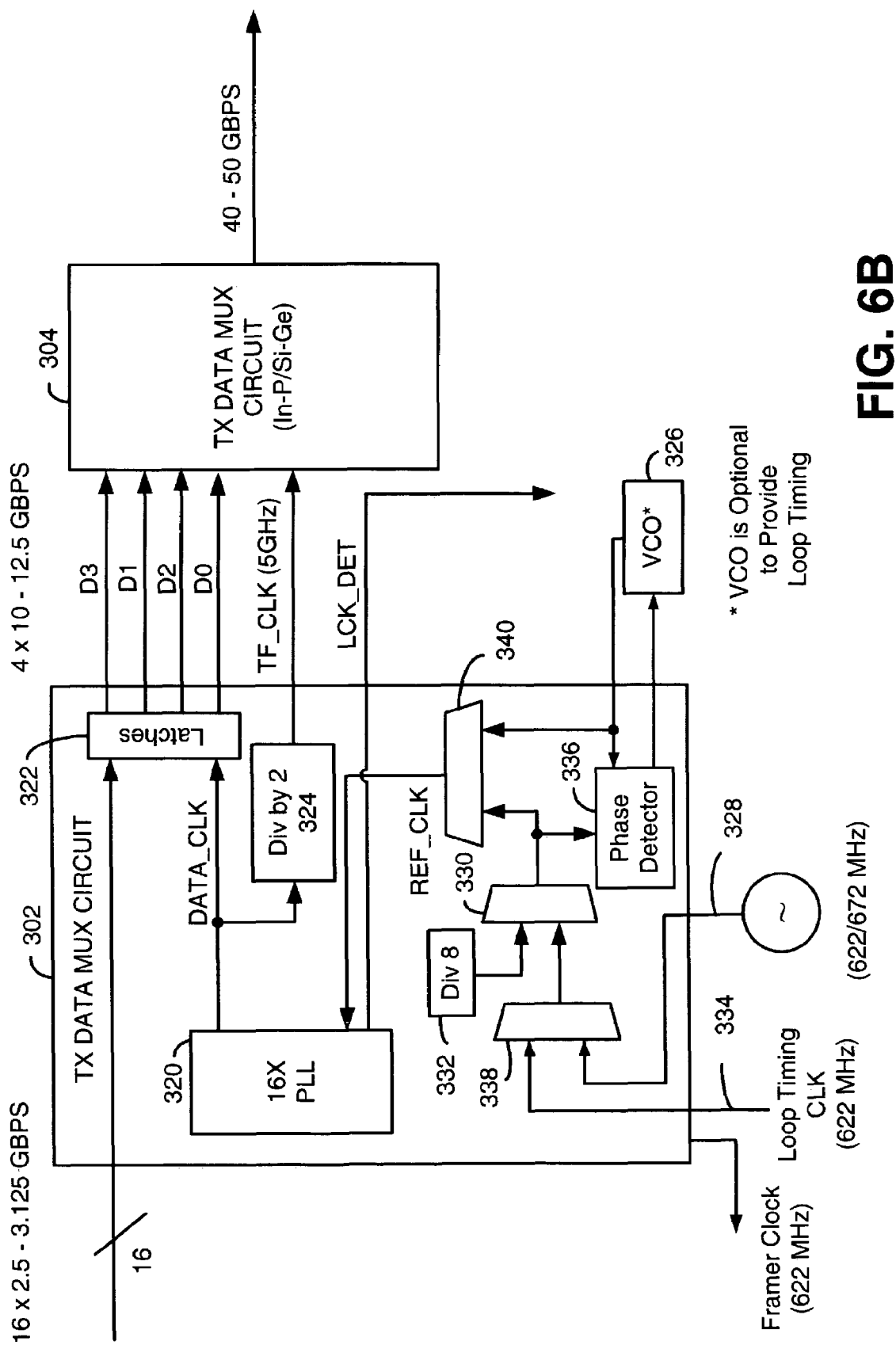
FIG. 6B provides a block diagram that functionally illustrates the many sources of the reference clock used to latch data within the upstream multiplexer circuit.

FIG. 6B depicts an embodiment where TX data multiplexer 302 couples to a less capable downstream TX data multiplexer 304. Here, TX data multiplexer 304 does not produce a reverse clock. Removing this functionality from the downstream multiplexer allows the circuit formed in processes that support higher switch rates to be simplified. This simplification improves manufacturing yield and reduces manufacturing cost associated with these circuits that support higher switching rates. Further, this embodiment demonstrates the increased versatility of the upstream multiplexer taught within this disclosure.

FIG. 7 includes a table and a diagram that illustrate operating specifications for the TX interface between the TX data multiplexer circuits 302 and 304 of FIG. 3. As shown in FIG. 7, the receiver input parameters are shown at 800 and an equivalent circuit thereupon is shown at 802.

Figure 8:
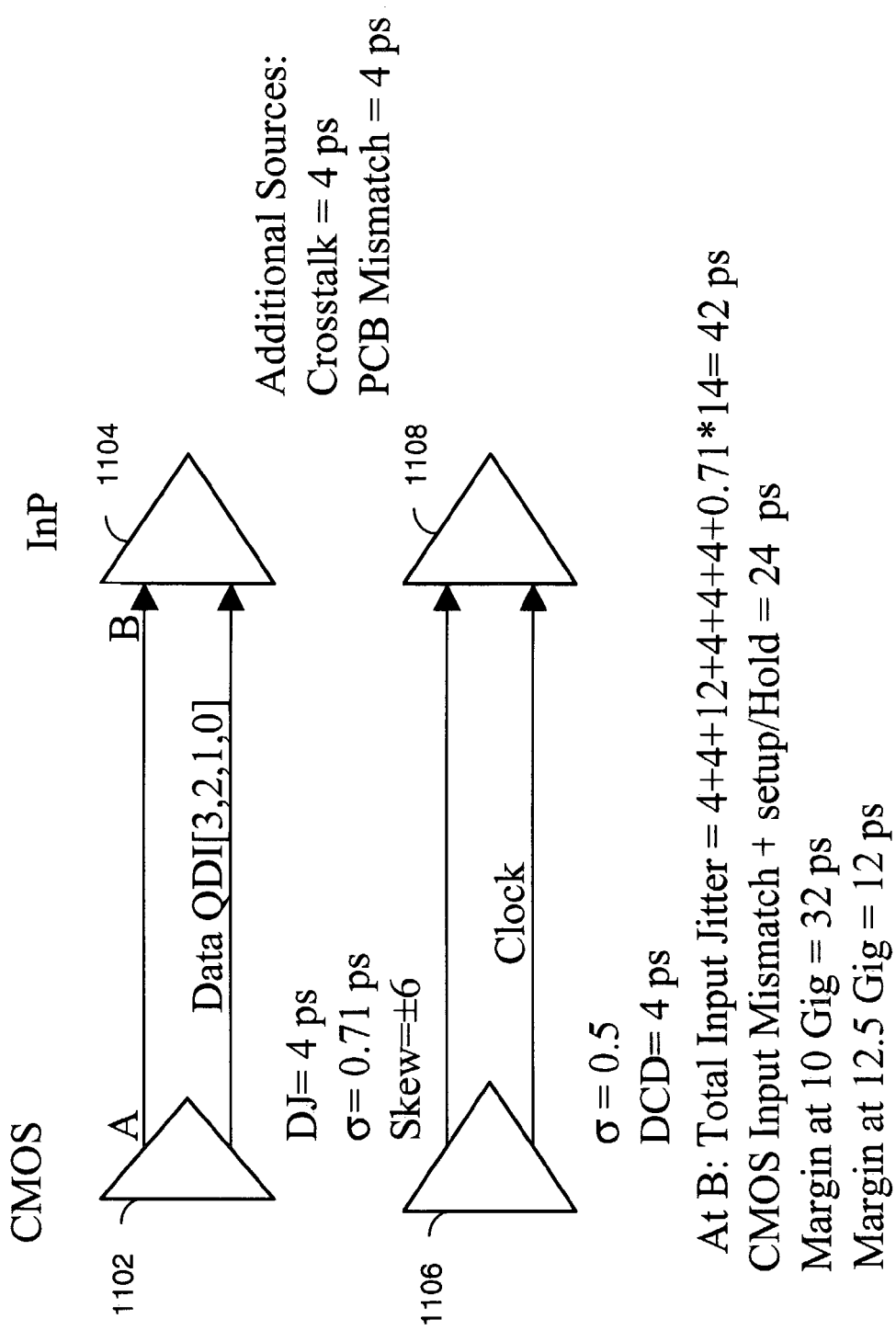
FIG. 8 provides a block diagram illustrating the jitter allocation for the RX link between RX data demultiplexer circuits of FIG. 3

FIG. 8 provides a block diagram illustrating the jitter allocation for the RX link between RX data demultiplexer circuits 308 and 306 of FIG. 3. One of four data differential data line drivers 1102 of RX data demultiplexer circuit 308 and a differential clock driver 1106 of RX data demultiplexer circuit 308 on the 4 bit stream 10 GBPS side are shown. FIG. 8 also depicts one of four data input buffers 1104 of the RX data demultiplexer circuit 306 and a clock input buffer 1108 of the RX data demultiplexer circuit 306. As is indicated, deterministic jitter for the data interface is specified as a maximum of 8 picoseconds. Further, the skew or non-deterministic jitter in the data lines is limited to ±8 picoseconds. The additional information provided in FIG. 8 shows how these jitters may be summed to result in maximum jitters.

Figure 9:
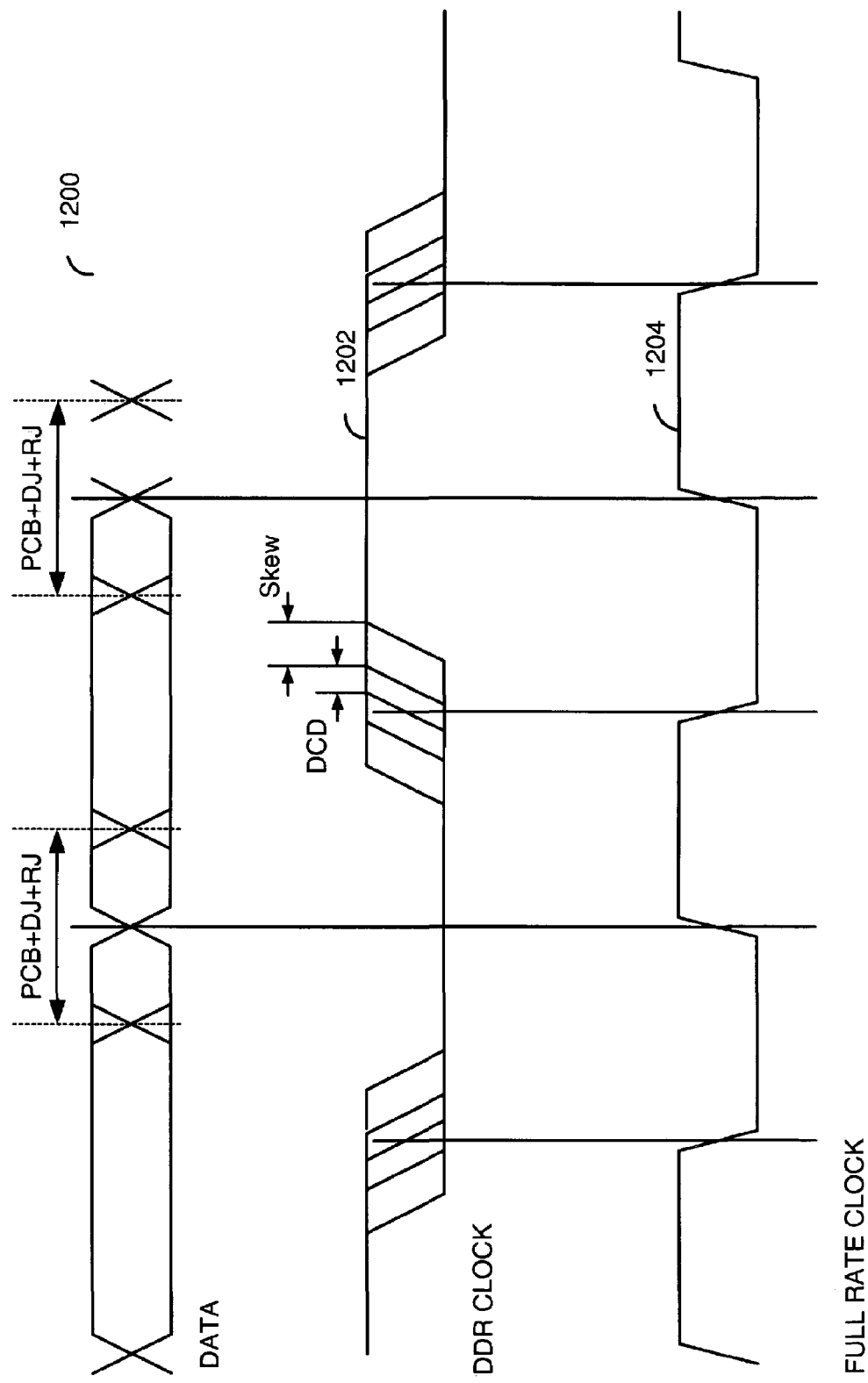
FIG. 9 includes timing diagrams illustrating the set up and hold operations on the 4 bit wide×10 GBPS links between the TX data multiplexer circuits of FIG. 3.

FIG. 9 is a timing diagram illustrating the set up and hold operations on the 4 bit×10 GBPS links between the TX data demultiplexer integrated circuits 306 and 308 of FIG. 3. In particular, the diagram illustrates the jitter relationships and definitions of the data 1200, the DDR clock 1202 and a full rate clock 1204.

Figure 10:
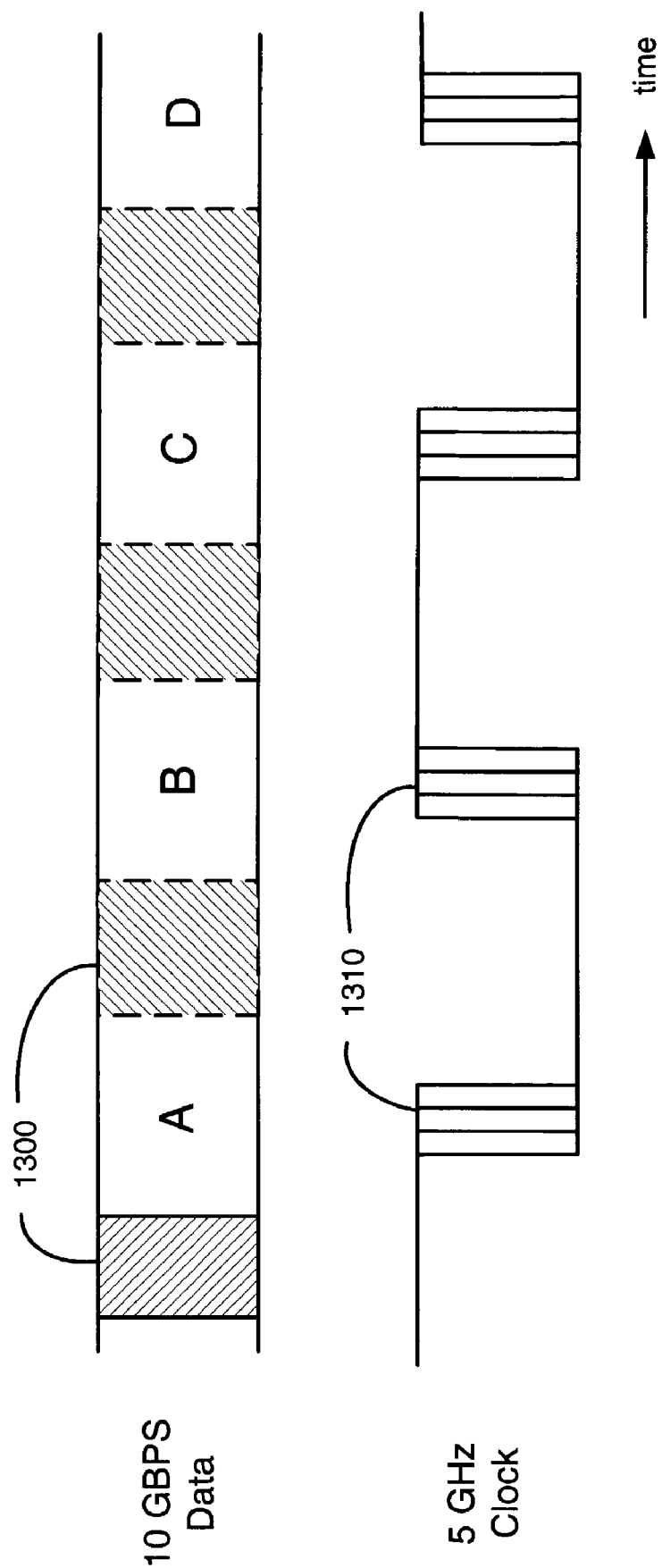
FIG. 10 provides an illustration of the jitter that can be experienced by the four 10 GPBS data inputs in relation to the jitter experienced by the 5 GHz clock input between the TX data multiplexer circuits of FIG. 3.

FIG. 10 illustrates jitter that can be experienced by the four 10 GPBS data inputs in relation to the jitter experienced by the 5 GHz clock input to TX data multiplexer circuit 304. Because of this jitter, there is little or no room for error regarding the skewing that can be permitted to occur between the clock arriving at the various multiplexers within TX data multiplexer circuit 304 and the data to be multiplexed by TX data multiplexer circuit 302. Given the amount of jitter 1300 that can occur on the data, in combination with the jitter 1310 that can occur on the clock, and the frequency at which the clock and data are switching, there is very little guaranteed open window during which the data can be latched.

Figure 11:
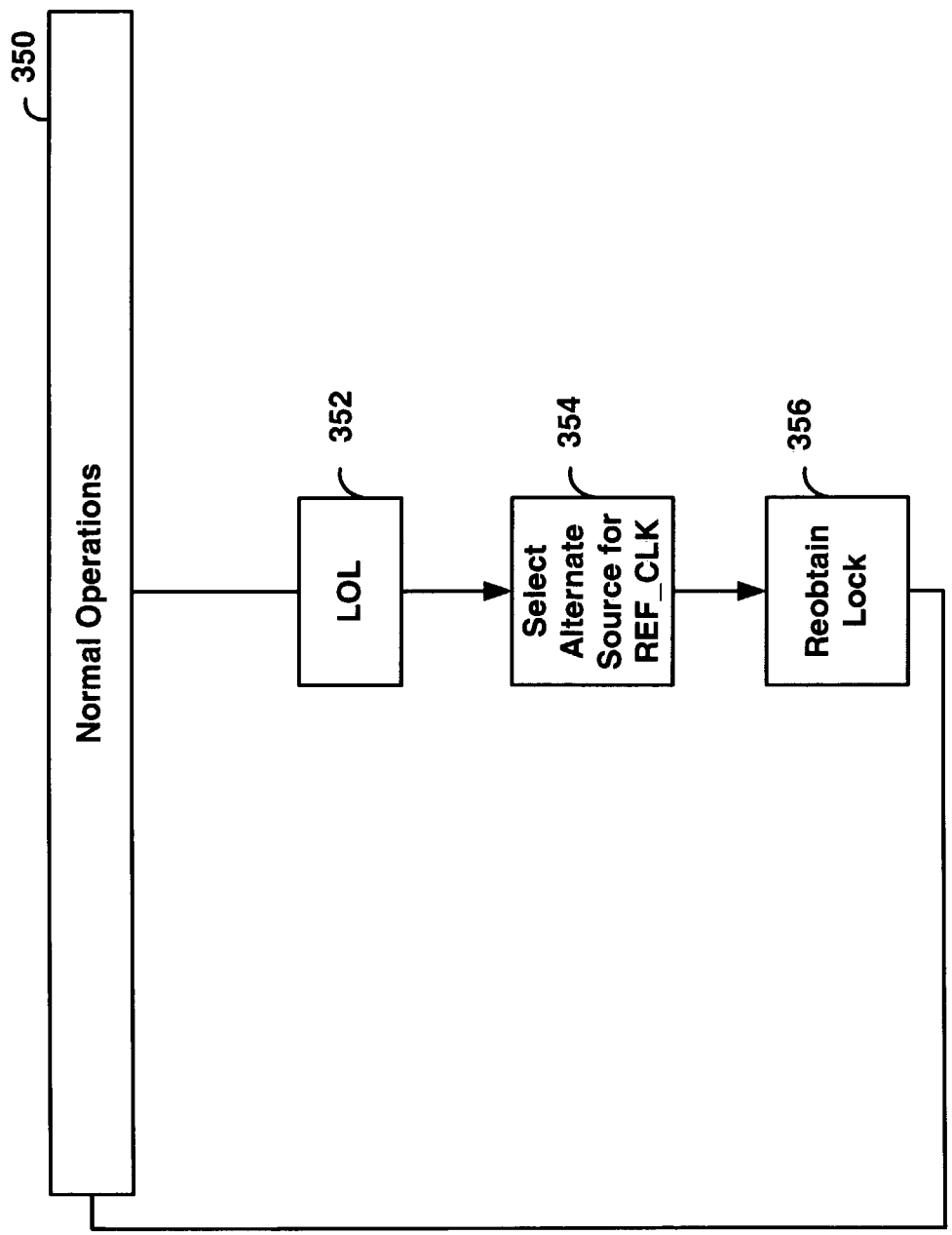
FIG. 11 shows the processes that occur when a deviation from normal operations has occurred.

FIG. 11 provides a logic diagram that illustrates what occurs when the multi-stage demultiplexer deviates from normal operations 350. If a loss of Lock (LOL) is experienced as indicated at block 352, meaning that PLL is not phase locked with the reference clock REF_CLK, an output signal can be provided as an input from the second stage TX data multiplexer circuit. If the TX data multiplexer circuit is deriving REF_CLK from either the VCO or the oscillator reference output, and the PLL loses its lock for greater than a predetermined time, TX data multiplexer circuit can assert the select signal input at circuit 330, choosing an alternative source for the REF_CLK such as reverse transmit clock, TR_CLK. This will ensure continued operation if for example, the oscillator or VCO becomes inoperative or otherwise malfunctions with an alternative source in block 356.

FIG. 12 is a block diagram illustrating a structure employed to implement multiplexers. The structure of FIG. 12 illustrates the relationship of the data and clock inputs to the delay elements 2402, 2404, and 2408. Multiplexer latches 1202 and 1204 couple to data input and a common clock input from the output of delay element 2404. Multiplexer latch 1202 triggers on the positive edge of the clock while multiplexer latch 1204 triggers on the negative edge of the clock. On the positive edge of a first clock cycle, bit TX15 is latched into demultiplexer latch 1202 and provided as an output. On the negative edge of the first clock cycle, TX11 is latched into multiplexer latch 1204 and provided as an output. During a next clock cycle bit TX7 is latched into multiplexer latch 1202 on a positive edge and provided as an output while TX3 is latched into multiplexer latch 1204 on a negative edge and provided as an output.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A multistage bit stream multiplexer having a switchable forward/reverse clock relationship comprising:
    a first multiplexing integrated circuit that receives a first plurality of bit streams at a first bit rate and that produces a second plurality of bit streams at a second bit rate, wherein the first plurality of bit streams are greater in number than the second plurality of bit streams are in number, and wherein the first bit rate is less than the second bit rate, the first multiplexing integrated circuit including:
        a phase locked loop (PLL) that receives a reference clock signal and produces a PLL Data Clock having a frequency equal to the second bit rate, and
        wherein a plurality of latches receive the PLL Data Clock, latch data multiplexed from the first plurality of bits streams, and produce the second plurality of bit streams;
    a second multiplexing integrated circuit that receives the second plurality of bit streams and that outputs at least one high-speed bit stream at a line bit rate that exceeds the second bit rate; and
    a clock circuit, wherein the clock circuit generates a forward transmit clock for use by the first multiplexing integrated circuit in producing the second plurality of bit streams based upon a reference clock signal that is selectable from a plurality of inputs based upon a clock selector input, wherein the plurality of inputs include a reverse transmit clock generated by the second multiplexing integrated circuit.

2. The multistage bit stream multiplexer of claim 1, further comprising:
    a communication Application Specific Integrated Circuit (ASIC) from which the first multiplexing integrated circuit receives the first plurality of bit streams; and
    a media interface that receives the at least one high-speed bit stream and produces a media output.

3. The multistage bit stream multiplexer of claim 1, wherein the plurality of inputs further comprises an external oscillator output.

4. The multistage bit stream multiplexer of claim 1, wherein the plurality of inputs further comprises a voltage controlled oscillator output.

5. The multistage bit stream multiplexer of claim 4, wherein the first multiplexing integrated circuit further comprises a phase detector that receives a first input from a loop timing circuit and a second input from one of the plurality of inputs.

6. The multistage bit stream multiplexer of claim 1, wherein the frequency of the PLL Data Clock is 16 times the frequency of the reference clock.

7. The multistage bit stream multiplexer of claim 6, further comprising a division circuit that receives the PLL Data Clock and generates an output used to produce the forward transmit clock.

8. The multistage bit stream multiplexer of claim 1, wherein the forward transmit clock is a source centered double data rate clock with respect to each of the plurality of second bit streams.

9. The multistage bit stream multiplexer of claim 1, wherein the PLL outputs to the second multiplexing integrated circuit a lock detect signal that remains active while the PLL is locked to the reference clock signal and becomes inactive when the PLL is not locked to the reference clock signal, and wherein the first multiplexing integrated circuit selects the reverse clock through the clock selector input when the PLL is not locked to the reference clock signal.

10. The multistage bit stream multiplexer of claim 1, wherein the first multiplexing integrated circuit comprises integrated circuits formed on a silicon substrate and the second multiplexing integrated circuit comprises a substrate selected from the group consisting of InP, SiGe, GaN, GaAs, and Si.

11. An upstream multiplexing integrated circuit within a multi-stage bit stream multiplexer that operates with a switchable forward/reverse lock relationship with a downstream multiplexing integrated circuit, comprising:
    a plurality of input ports operable to receive a first plurality of bit streams at a first bit rate;
    a plurality of output ports to output a second plurality of bit streams at a second bit rate, wherein the first plurality of bit streams is greater in number than the second plurality of bit streams are in number, and wherein the first bit rate is less than the second bit rate;
    a clock circuit that generates a forward transmit clock signal for use by the upstream multiplexing integrated circuit in producing the second plurality of bit streams based upon a reference clock signal selectable from a plurality of inputs, wherein said inputs include a reverse transmit clock generated by the downstream integrated circuit; and
    a phase locked loop (PLL) that receives the reference clock signal and produces a PLL Data Clock having a frequency equal to the second bit rate, wherein a plurality of latches receive the PLL Data Clock, latch data multiplexed from the first bit streams and produce the plurality of second bit streams.

12. The upstream multiplexing integrated circuit of claim 11, wherein the first plurality of bit streams are received from a communication Application Specific Integrated Circuit (ASIC) from which the first multiplexing integrated circuit receives the first plurality of bit streams, and wherein the downstream multiplexing integrated circuit outputs at least one high-speed bit stream to a media interface that produces a media output.

13. The upstream multiplexing integrated circuit of claim 11, wherein the plurality of inputs include an external oscillator output.

14. The upstream multiplexing integrated circuit of claim 11, wherein the plurality of inputs include a voltage-controlled oscillator output.

15. The upstream multiplexing integrated circuit of claim 11, wherein the reference clock signal is selected based upon a clock selector input.

16. The upstream multiplexing integrated circuit of claim 11, wherein the frequency of the PLL Data Clock comprises 16 times the frequency of the reference clock.

17. The upstream multiplexing integrated circuit of claim 11, further comprising a division circuit that receives the PLL Data Clock and generates an output used to produce the forward transmit clock.

18. The upstream multiplexing integrated circuit of claim 11, wherein the forward transmit clock is a source centered double data rate clock with respect to the second plurality of bit streams.

19. The upstream multiplexing integrated circuit of claim 11, wherein the PLL outputs to the upstream multiplexing integrated circuit a lock detect signal that remains active while the PLL is locked to the reference clock signal and becomes inactive when the PLL is not locked to the reference clock signal, and wherein the downstream multiplexing integrated circuit selects the reverse transmit clock through a clock selector input when the PLL is not locked to the reference clock.

20. The upstream multiplexing integrated circuit of claim 11, wherein the reverse transmit clock is based on an external oscillator reference clock.

21. The upstream multiplexing integrated circuit of claim 11, further comprising a phase detector that receives a first input from a loop clock and a second input from the voltage controlled oscillator.

22. The upstream multiplexing integrated circuit of claim 11, further comprising a Si substrate, and wherein the downstream multiplexing integrated circuit comprises a substrate selected from the group consisting of InP, SiGe, GaN, GaAs, and Si and wherein the second multiplexing integrated circuit comprises integrated circuits formed on a Si substrate.

23. A method of multiplexing a first plurality of bit streams to at least one high-speed bit stream with a multistage multiplexer, comprising:
receiving the first plurality of bit streams at a first stage multiplexing integrated circuit at a first bit rate;
multiplexing the first plurality of bit streams into a second plurality of bit streams at a second bit rate, wherein the second bit rate exceeds the first bit rate;
receiving the second plurality of bit streams at a second stage multiplexing integrated circuit at a second bit rate, wherein the second plurality of bit streams are fewer in number than the first plurality of bit streams is in number;
multiplexing the second plurality of bit streams into the at least one high-speed bit stream having a line bit rate that exceeds the second bit rate:
generating a forward transmit clock from a reference clock signal selectable from a plurality of inputs, wherein the plurality of inputs include a reverse transmit clock generated by the second stage multiplexing integrated circuit; and producing from the reference clock signal a Phase Locked Loop (PLL) Data Clock having a frequency equal to the second bit rate with a PLL, wherein a plurality of latches receive the PLL Data Clock, latch multiplexed data from the first bit streams, and produce the plurality of second bit streams.

24. The method of claim 23 further comprises:
producing a lock detect signal to indicate when the PLL is locked to the reference clock signal, wherein a reverse transmit clock is selected as the reference clock signal when the PLL is not locked to the reference clock.

25. The method of claim 23, wherein the first plurality of bit streams are received from a communication Application Specific Integrated Circuit (ASIC), and wherein the second stage multiplexing integrated circuit outputs the at least one high speed bit stream to a media interface that produces a media output.

26. The method of claim 23, wherein the plurality of inputs include an external oscillator output.

27. The method of claim 23, wherein the plurality of inputs include a voltage-controlled oscillator output.

28. The method of claim 23, further comprises:
selecting the reference clock signal with a clock selector input.

29. The method of claim 23, wherein the frequency of the PLL Data Clock is 16 times the frequency of the reference clock signal.

30. The method of claim 23, further comprising a division circuit that receives the PLL Data Clock and generates an output used to produce the forward transmit clock.

31. The method of claim 23, wherein the forward transmit clock is a source centered double data rate clock with respect to the second plurality of bit streams.

32. The method of claim 23, further comprises:
generating a lock detect signal that remains active while the PLL is locked to the reference clock signal and becomes inactive when the PLL is not locked to the reference clock signal; and
selecting the reverse transmit clock as the reference clock signal through a clock selector input when the PLL is not locked to the reference clock signal.

33. The method of claim 23, wherein the reverse transmit clock is based on an external oscillator reference clock.

34. The method of claim 23, further comprises a phase detector that receives a first input from a loop clock and a second input from a voltage controlled oscillator.

35. The method of claim 23, further comprises a Si substrate, and wherein the downstream multiplexing integrated circuit includes a substrate selected from the group consisting of InP, SiGe, GaN, GaAs, and Si and wherein the second multiplexing integrated circuit comprises integrated circuits formed on a Si substrate.

36. A method of multiplexing a first plurality of bit streams to at least one high-speed bit stream with a multistage multiplexer, comprises:
receiving the first plurality of bit streams at a first stage multiplexing integrated circuit at a first bit rate;
multiplexing the first plurality of bit streams into a second plurality of bit streams at a second bit rate;
receiving the second plurality of bit streams at a second stage multiplexing integrated circuit at a second bit rate, wherein the second plurality of bit streams are fewer in number than the first plurality of bit streams are in number, and wherein the first bit rate is less than the second bit rate;

multiplexing the second plurality of bit streams into the at least one high-speed bit streams at a line bit rate that exceeds the second bit rate;

generating a forward transmit clock from a reference clock signal selectable from a plurality of inputs, wherein the plurality of inputs include a reverse transmit clock generated by the second stage multiplexing integrated circuit; and producing a lock detect signal to indicate when a PLL is locked to the reference clock signal, wherein the reverse transmit clock is selected as the reference clock signal when the PLL is not locked to the reference clock.

37. A method of multiplexing a first plurality of bit streams to at least one high-speed bit stream with a multistage multiplexer, comprising:

receiving the first plurality of bit streams at a first stage multiplexing integrated circuit at a first bit rate;

multiplexing the first plurality of bit streams into a second plurality of bit streams at a second bit rate, wherein the second bit rate exceeds the first bit rate;

receiving the second plurality of bit streams at a second stage multiplexing integrated circuit at a second bit rate, wherein the second plurality of bit streams are fewer in number than the first plurality of bit streams is in number;

multiplexing the second plurality of bit streams into the at least one high-speed bit stream having a line bit rate that exceeds the second bit rate;

generating a forward transmit clock from a reference clock signal selectable from a plurality of inputs, wherein the plurality of inputs include a reverse transmit clock generated by the second stage multiplexing integrated circuit; and producing a lock detect signal to indicate when a PLL is locked to the reference clock signal, wherein a reverse transmit clock is selected as the reference clock signal when the PLL is not locked to the reference clock.

38. The method of claim 37, wherein the first plurality of bit streams are received from a communication Application Specific Integrated Circuit (ASIC), and wherein the second stage multiplexing integrated circuit outputs the at least one high speed bit stream to a media interface that produces a media output.

39. The method of claim 37, wherein the plurality of inputs include an external oscillator output.

40. The method of claim 37, wherein the plurality of inputs include a voltage-controlled oscillator output.

41. The method of claim 37, further comprises:
selecting the reference clock signal with a clock selector input.

42. The method of claim 37, further comprising:
receiving the reference clock signal and producing a Phase Locked Loop (PLL) Data Clock having a frequency equal to the second bit rate with the PLL, wherein a plurality of latches receive the PLL Data Clock, latch multiplexed data from the first bit streams, and produce the plurality of second bit streams.

43. The method of claim 42, wherein the frequency of the PLL Data Clock is 16 times the frequency of the reference clock signal.

44. The method of claim 42, further comprising a division circuit that receives the PLL Data Clock and generates an output used to produce the forward transmit clock.

45. The method of claim 42, wherein the forward transmit clock is a source centered double data rate clock with respect to the second plurality of bit streams.

46. The method of claim 42, further comprises a phase detector that receives a first input from a loop clock and a second input from a voltage controlled oscillator.

47. The method of claim 42, further comprises a Si substrate, and wherein the downstream multiplexing integrated circuit includes a substrate selected from the group consisting of InP, SiGe, GaN, GaAs, and Si and wherein the second multiplexing integrated circuit comprises integrated circuits formed on a Si substrate.

48. The method of claim 37, wherein the reverse transmit clock is based on an external oscillator reference clock.

* * * * *